United States Patent [19]

Steps

[11] Patent Number: 4,724,518
[45] Date of Patent: Feb. 9, 1988

[54] ODD/EVEN STORAGE IN CACHE MEMORY

[75] Inventor: Steven C. Steps, San Jose, Calif.

[73] Assignee: Hewlett-Packard Company, Palo Alto, Calif.

[21] Appl. No.: 65,160

[22] Filed: Jun. 16, 1987

Related U.S. Application Data

[63] Continuation of Ser. No. 518,599, Jul. 29, 1983, abandoned.

[51] Int. Cl.[4] .................... G06F 12/02; G06F 12/08
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,041,461 | 8/1977 | Kratz et al. | 364/200 |
| 4,044,337 | 8/1977 | Hicks et al. | 364/200 |
| 4,047,244 | 9/1977 | Finkemeyer et al. | 364/200 |
| 4,149,239 | 4/1979 | Jenkins et al. | 364/200 |
| 4,293,210 | 10/1981 | Flusche et al. | 364/200 |
| 4,309,754 | 1/1982 | Dinwiddie, Jr. | 364/200 |
| 4,395,754 | 7/1983 | Feissel | 364/200 |
| 4,430,712 | 2/1984 | Coulson et al. | 364/300 |
| 4,445,172 | 4/1984 | Peters et al. | 364/200 |
| 4,467,421 | 8/1984 | White | 364/200 |
| 4,468,730 | 8/1984 | Dodd et al. | 364/200 |
| 4,476,526 | 10/1984 | Dodd | 364/200 |
| 4,503,501 | 3/1985 | Coulson et al. | 364/300 |
| 4,513,372 | 4/1985 | Ziegler et al. | 364/200 |
| 4,536,836 | 8/1985 | Dodd et al. | 364/200 |

Primary Examiner—Raulfe B. Zache
Assistant Examiner—Thomas C. Lee
Attorney, Agent, or Firm—Jeffery B. Fromm

[57] ABSTRACT

Provided is a cache memory architecture which is two blocks wide and is made up of a map RAM, two cache data RAMs (each one word wide), and a selection system for selecting data from either one or both cache data RAMs, depending on whether the access is between cache and CPU, or between cache and main memory. The data stored in the two cache data RAMs has a particular address configuration. It consists of having data with even addresses of even pages and odd addresses of odd pages stored in one cache data RAM, with odd addresses and even addresses interleaved therein; and odd addresses of even pages and even addresses of odd pages stored in the other cache data RAM, with the odd addresses and even addresses interleaved but inverted relative to the other cache data RAM.

10 Claims, 4 Drawing Figures

ODD/EVEN STORAGE IN CACHE MEMORY

This is a continuation of application Ser. No. 518,599, filed July 29, 1983, now abandoned.

FIELD OF THE INVENTION

This invention concerns computer architecture and particularly the relationship of odd/even storage in cache memory to enhance machine performance.

BACKGROUND OF THE INVENTION

In the last several years, computer architecture has undergone significant changes, particularly in the area of memory hierarchies, i.e., where a memory system is built of more than one memory technology.

A typical example of such a system is in the use of a cache memory. Generally, cache memory is a small, fast, associative memory located between the central processing unit (CPU) and the main memory. Conceptually to the micromachine, a cache memory looks like nothing other than a very fast main memory. Internally, however, the cache memory works by keeping pieces of main memory (called blocks, always a power of two words in size) in a local very high speed RAM. However, to keep track of these blocks, the cache needs to keep an identifier with each one. These identifiers are called TAGs and are the main memory address of each block. In a set associative cache, the "frame" into which main memory blocks can be placed are distinguished by their lower addresses. Thus, any two blocks can both be in the cache as long as their lower addresses are not the same. If their lower addresses are the same, then the TAG need not have the lower address bits, since each block is identified simply by the frame in which it is being kept.

During a cache access, the cache uses the lower address bits to select a cache frame. The TAG from this frame is compared to the upper address bits to see if they match. If so, then the data in that frame is what is desired. If the TAG does not match with the upper address bits, then a "miss" has occurred. To keep the CPU from knowing that something is wrong, the CPU is frozen. The cache then takes the TAG and the lower address bits and writes its present block back into main memory. It then uses the total address from the CPU to read a new block from main memory. This block is then stored in the cache with the TAG set to the new upper address bits. (See, for example, "Computer Engineering—a DEC View of Hardware System Design", 1978, Chapter 10, pages 263-267, entitled "Cache Memories for PDP-11 Family Computers" by William D. Strecker.)

Also in the prior art, it is customary to use a logical address to physical address translation in order to expand the number of physical memory locations which can be addressed by the CPU. This is generally accomplished by using a portion of the CPU address as a logical address, and then using a dynamic mapping system, typically a map RAM, between the CPU and the cache as an address decoder. With this scheme, the total memory address is not known until after the map RAM access, which is serial in the cache access time. Hence, to speed up cache access, it is conventional to make the map RAM as fast as possible. Unfortunately, however, these faster RAMs are less dense, take up more board space, and are also expensive on a per bit basis.

SUMMARY OF THE INVENTION

In accordance with preferred embodiments of the invention, provided is a cache memory architecture which is two blocks wide and is made up of a map RAM, two cache data RAMs (each one word wide), and a selection system for selecting data from either one or both cache data RAMs, depending on whether the access is between cache and CPU, or between cache and main memory.

The data stored in the two cache data RAMS has a particular adress configuration. It consists of having data with even addresses of even pages and odd addresses of odd pages stored in one cache data RAM, with odd addresses and even addresses interleaved therein; and odd addresses of even pages and even addresses of odd pages stored in the other cache data RAM, with the odd addresses and even addresses interleaved but inverted relative to the other cache data RAM.

With this configuration, when a read from cache to CPU is executed, two physical pages can be read out simultaneously, one in each cache data RAM, and the lowest map RAM bit can be used to select between the two. The map RAM output is not used to address the cache data RAMs, hence the map RAM can operate in parallel with the cache data RAM access and thereby not restrict the cache access speed. Similarly, on a cache write to main memory, the switching system together with the address configuration permits a parallel transfer from both cache data RAMs to main memory at the same time.

DETAILED DESCRIPTION OF THE INVENTION

Figure 1:
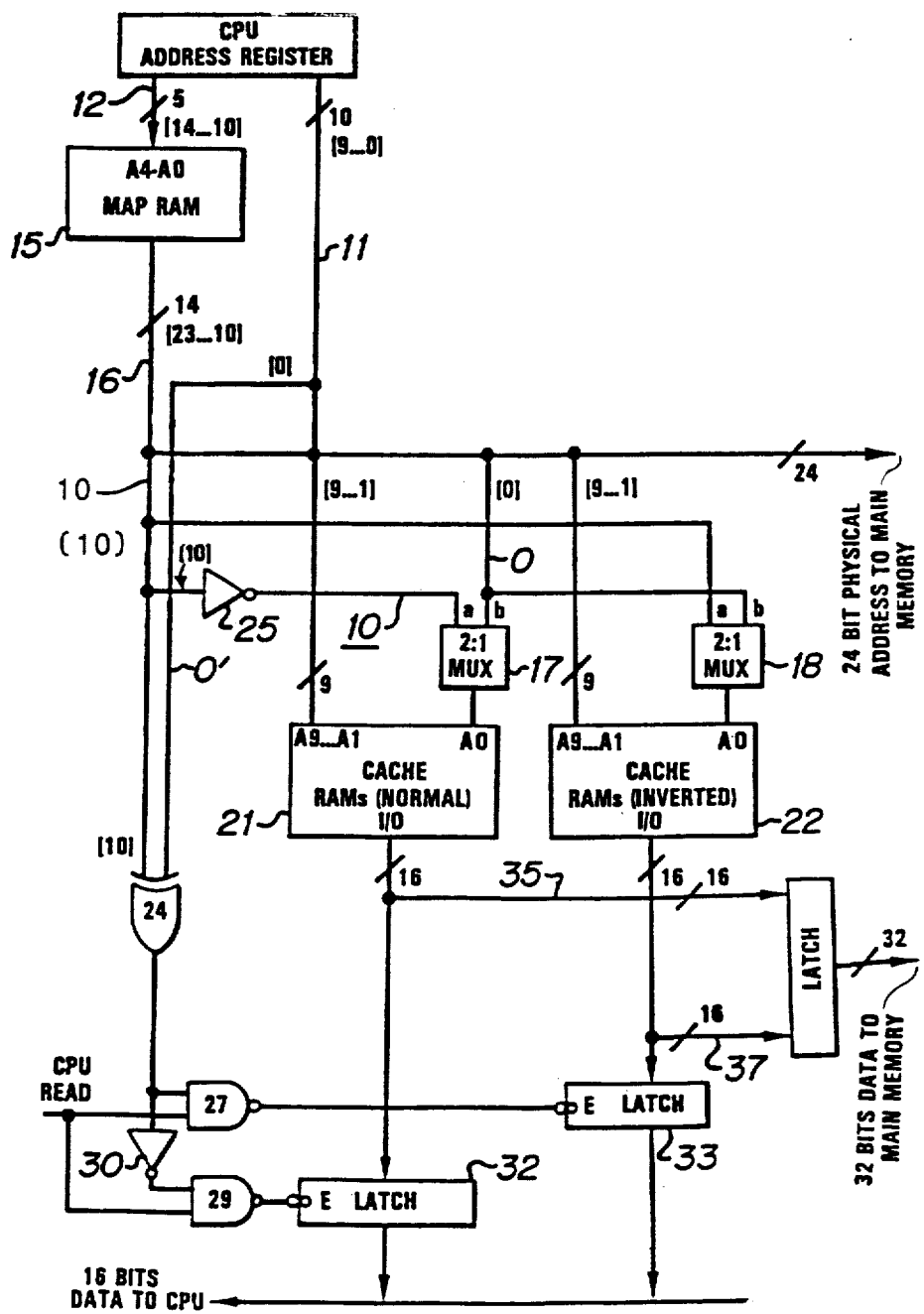
FIG. 1 shows the details of the cache memory architecture according to the invention.

In accordance with the preferred embodiments of the invention, shown in FIG. 1 is an architecture for a high speed addressing system in a cache memory. In this particular embodiment, the cache is implemented with a dynamic mapping system (DMS), so the output of the CPU address register has been separated into page offset lines 11 and logical page lines 12. The page offset lines correspond to the lower 10 bits of the CPU address which identify the particular words that are located within a given page in main memory. The logical page lines correspond to CPU bits 10 through 14, and represent the logical address being mapped by the DMS.

The DMS (map RAM 15) is used to decode the logical address, thereby providing a 14-bit tag on tag line 16 corresponding to physical pages in main memory. When writing from cache to main memory, tag line 16 together with page offset lines 11 provide a 24-bit physical address to main memory. In this particular embodiment, map RAM 15 is typically implemented as a 1K×4, 45ns RAM, except for the bottom bit, bit [10], which is in a 1K×1, 20ns RAM, the higher speed for the bottom bit being important for switching purposes as will be discussed later.

Page offset lines 11 are coupled to the address inputs of cache data RAMs 21 and 22, except for the bottom bit line which corresponds to odd or even addresses. The cache data RAMs in this particular embodiment are each 1K×16, the CPU is 16 bits wide, and main memory is 16 bits wide. Taken together, the cache data RAMs have 4K bytes of memory, with a two-word block size, and a set associativity of one (i.e., direct mapped).

The bottom bit line, instead of being coupled directly to cache data RAMs 21 and 22, is routed to the b-input of multiplexers 17 and 18 via bit line 0. This bottom bit, i.e., bit [0], is also routed by bit line 0' to one input of an exclusive —OR gate 24. Bit line 10, carrying the tenth bit (the bottom bit of the tag) and thereby designating odd or even pages, is routed to the a-input of multiplexer 18, to the other input of exclusive —OR 24, and also to the input of inverter 25. Bit line 10 then carries the inverted bottom bit from the output of inverter 25 to the a-input of multiplexer 17. Also, the output of multiplexers 17 and 18 are routed to the zeroth address input of cache RAMs 21 and 22, respectively. In this configuration, multiplexers 17 and 18 can then be used when selecting between cache/CPU accesses (when the b-input is enabled), and cache/main memory accesses (when the a-input is enabled).

The output of exclusive-OR 24 is connected to NAND gate 27, and to NAND gate 29 through inverter 30, in order to control latches 32 and 33, so that on a CPU read from cache, latch 32 is enabled only when bit [10] and bit [0] are both odd or both even, and latch 33 is enabled only when bit [10] and bit [0] are either odd and even or even and odd, respectively. On a write from cache to main memory (CPU read line=0) both latch 33 and latch 32 are enabled.

Figures 2, 3:
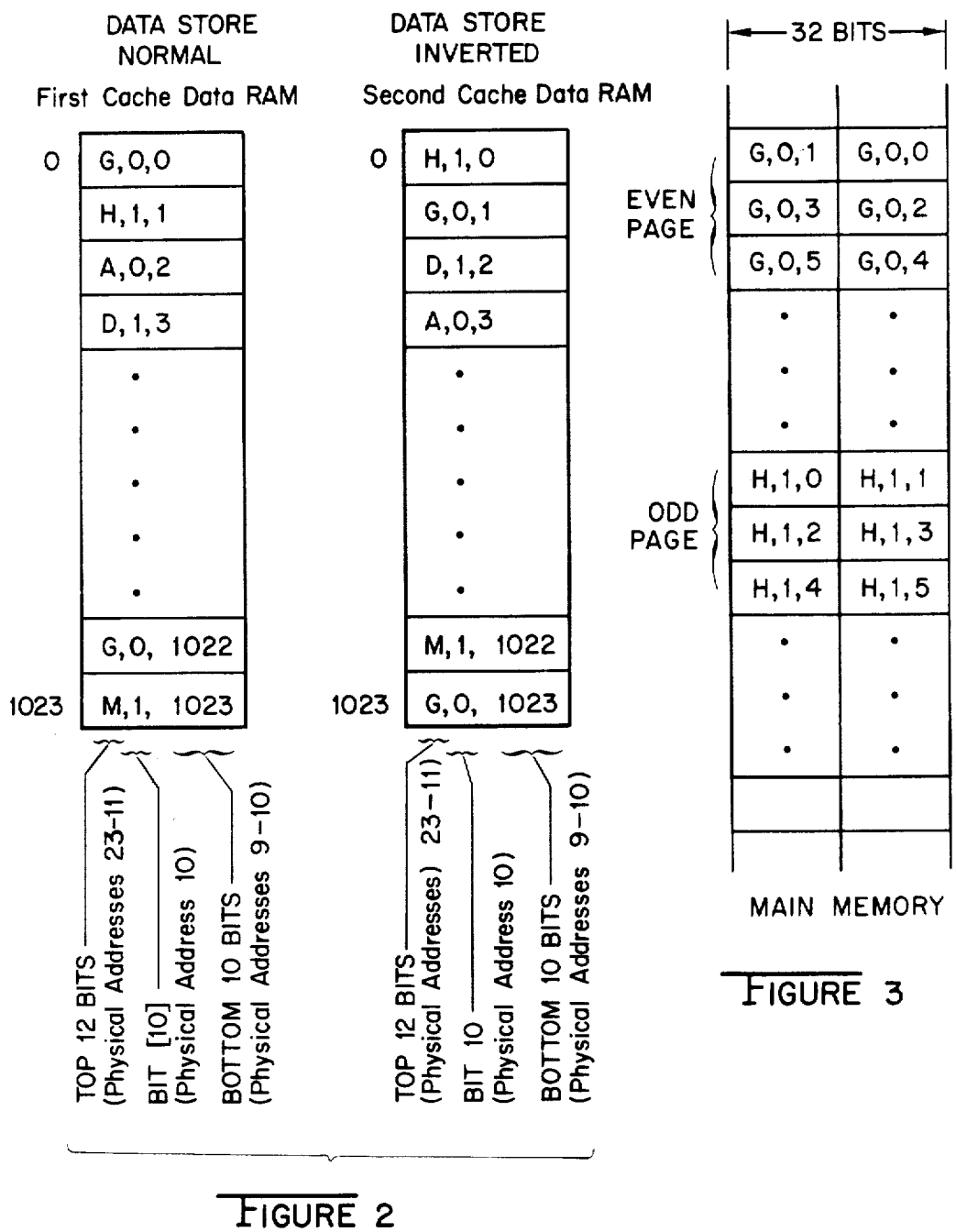
FIG. 2 shows the address configuration of cache data RAMs within the architecture.
FIG. 3 shows the address configuration of data in main memory.

One of the purposes of this odd-even arrangement is to be able to quickly select between the two cache RAMs during a CPU read from cache. To accomodate this selectivity involves a specialized organization of addresses within the cache data RAMs as shown in FIG. 2. In cache data RAM 21, data is stored which has addresses that correspond to even words (bit [0]=0) on even pages (bit [10]=0) and odd words (bit [0]=1) on odd pages (bit [10]=1), with even and odd pages interleaved. In cache data RAM 22, data is stored which has addresses that correspond to odd words (bit [0]=1) on even pages (bit [10]=0), and even words (bit [0]=0) on odd pages (bit [10]=1), again with even and odd pages interleaved, but inverted relative to RAM 21.

With this data configuration in cache, when a read from cache to CPU is executed, two physical pages can be read out simultaneously, one in each cache data RAM, and the lowest map RAM bit can be used to select between the two. Since, unlike the prior art, the map RAM output is not used at the input of the cache data RAMs, the DMS can be operating in parallel with the cache data RAM access. Furthermore, because only the lowest map RAM bit (physical address 10), is involved in the selection, it is relatively inexpensive to use a very fast RAM for the mapping of that one bit, so that the time from the initiation of the DMS function through the time required to enable latch 32 or 33 can be approximately the same as the time to access one of the cache data RAMs. Hence, the overall cache access time can be essentially as fast as the cache data RAMs themselves.

Similarly, for a cache write to main memory, the a-input of both multiplexers 17 and 18 are enabled as are latches 32 and 33, so that the two 16-bit data lines 35 and 37 to main memory provide a 32-bit parallel transfer from cache to main memory. The resulting address configuration in main memory is shown in FIG. 3.

This arrangement of blocks within cache and main memory also results in a short fault handling time, since words in the same block are separated and can be written into or read out of in parallel.

Those skilled in the art will realize that there are other hardware implementations encompassed by the invention which can be used to quickly select between cache data RAMs based on odd or even physical pages, and still have the DMS operate in parallel with the cache RAM access. For example, instead of using bit lines 0 to 10 to enable latches 32 and 33, these lines could be used to switch between the enable inputs of the cache data RAMs themselves.

Figure 4:
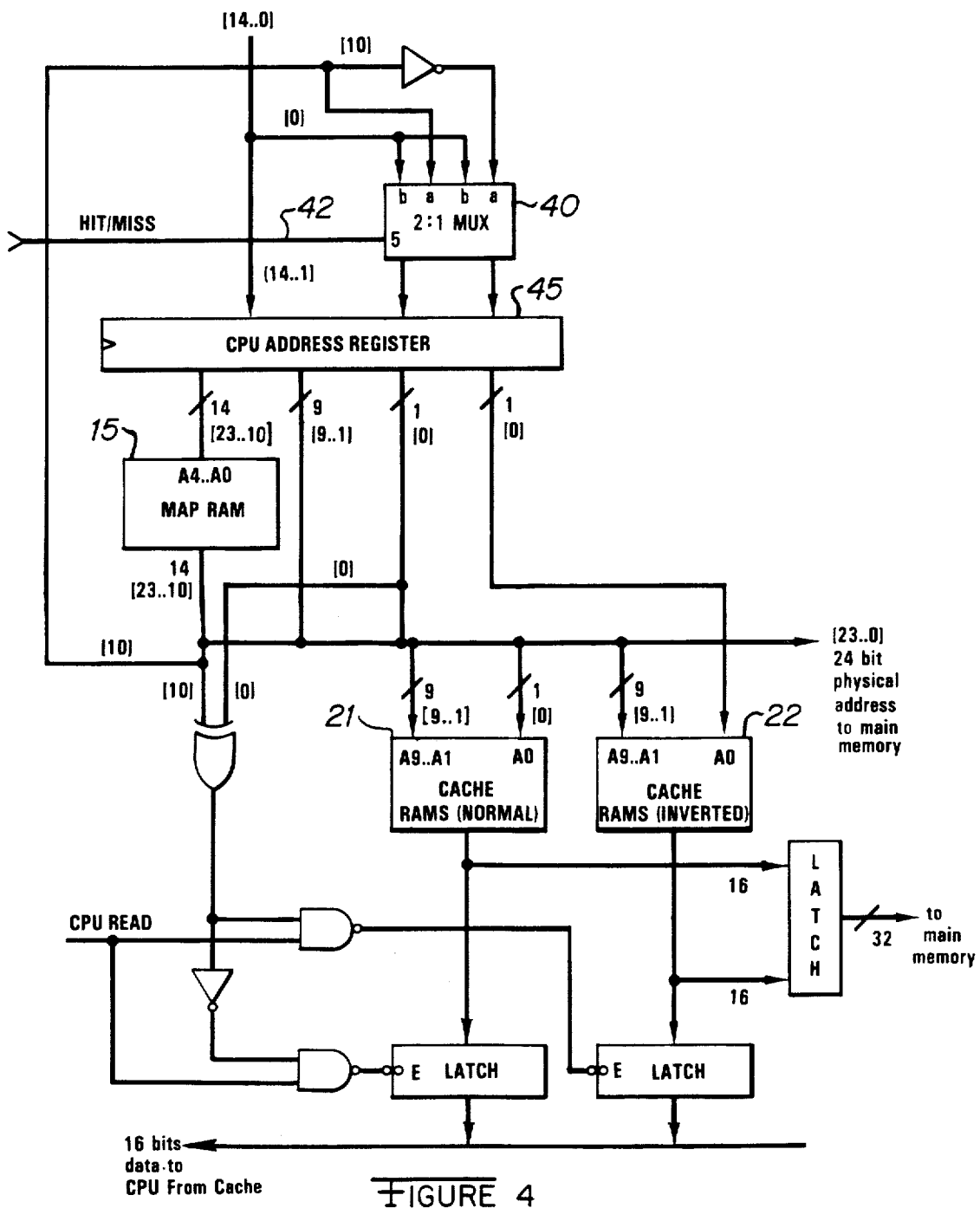
FIG. 4 shows the details of the cache memory architecture according to an alternative embodiment.

Those skilled in the art will also realize that multiplexers 17 and 18 of FIG. 1 can be placed before the CPU address register. This can be done because input a is not needed until after an access has been made to map RAM 15 using input a, since input a is not needed unless processing a fault (i.e., a miss). This alternative embodiment is shown in FIG. 4. Here, bit [0] and physical bit [10] (i.e., after map RAM 15) enter a dual 2:1 multiplexer 40 which is controlled by the signal from a hit/miss comparator (not shown) on signal line 42. (The hit/miss comparator determines whether the desired address is in the cache.) With a hit on a cache read to CPU, the dual output of multiplexer 40 passes through address register 45 and provides two outputs of bit [0], one to zeroth input of cache data RAM 21 and one to zeroth input of cache data RAM 22 (as in the first embodiment). Hence, the time from clocking the address register until data is sent to the CPU is strictly dependent upon the access speed of the cache data RAMs. The choice between using this alternative embodiment and the first embodiment is then based upon whether one wants the delay through the multiplexer to be before or after clocking the address register.

Similarly, those skilled in the art will also recognize, for example, that the word size, RAM size, and RAM speeds chosen for the particular embodiment presented are meant to be representative and should not be considered restrictive.

What is claimed is:
1. Apparatus comprising:
(a) cache memory means coupled to a central processing unit and to a main memory organized in even and odd pages, the cache memory means comprising first and second memory circuits each being one data unit wide and each having stored therein data to be read by the central processing unit or written to main memory;
  (i) the data stored in the first memory circuit corresponding to data units having even addresses of even pages and odd addresses of odd pages, with the data units having even addresses consecutively interleaved with the data units having odd addresses; and
  (ii) the data stored in the second memory circuit corresponding to data units having odd addresses of even pages and even addresses of odd pages, with the data units having even addresses consecutively interleaved with the data units having odd addresses, and with the data units in every odd pair of data units stored in the second memory unit being in inverted order relative to corresponding odd pairs of data units stored in the first memory circuit;

(b) selection means coupled to the cache memory means for selecting data from only one of the first and second memory circuits when a read operation from the cache memory means to the central processing unit is performed and for selecting data from both of the first and second memory circuits when a write operation from the cache memory means to the main memory is performed;

the cache memory means simultaneously outputting two data units, one from each of the first and second memory circuits whereby said output data units are originated from the odd page and even page simultaneously during said read operation and from one of the odd page and even page during the write operation respectively, the selection means selecting only one of the data units for reading by the central processing unit and selecting both of the data units for parallel writing thereof to the main memory.

2. Apparatus according to claim 1 further comprising a map RAM coupled to the central processing unit for converting logical addresses provided by the central processing unit to physical addresses, a low order bit of the physical address being provided to the selection means for selecting the data unit to be read by the central processing unit.

3. Apparatus according to claim 2 wherein the map RAM operates in parallel with first and second memory circuit data accesses.

4. Apparatus according to claim 1 further comprising:

(a) first latch means coupled to the first memory circuit for storing, in response to a first selection signal, a data unit output from the first memory circuit; and (b) second latch means coupled to the second memory circuit for storing, in response to a second selection signal, a data unit output from the second memory circuit;

the selection means being coupled to first and second bit lines signifying even and odd addresses and even and odd pages, respectively, and further coupled to the first and second latch means, and generating the first and second selection signals during a read operation from the cache memory means to the central processing unit, the selection means generating the first selection signal but not the second selection signal when the page and the address of the data unit read are either both even or both odd and generating the second selection signal but not the first selection signal when the page read is odd and the address of the data unit read is even and when the page read is even and the address of the data unit read is odd.

5. Method of operating a computer system having a central processing, a main memory, and a cache memory system comprising a dynamic mapping system and first and second cache memory units, the method comprising the steps of:

(a) storing data units in the first cache memory unit by consecutively interleaving data units having even addresses of even pages with data units having odd addresses of odd pages;

(b) storing data units in the second cache memory unit by consecutively interleaving data units having odd addresses of even pages with even addresses of odd pages;

(c) transmitting an address having a first and a second part from the central processor;

(d) receiving the first part of the address by the dynamic mapping system;

(e) receiving the second part of the address by the first and second cache memory units;

(f) activating data memory locations in both of the first and second cache memory units that correspond to the second part of the address for outputting stored data units therefrom;

(g) translating at least a portion of the first part of the address into a new address by the dynamic mapping system at the same time as the step of activating data memory locations; and (h) enabling the output from one of the first and second cache memory units in response to the new address;

whereby said data units outputted from the first and second cache memory units are originated from the odd page and even page simultaneously during a read operation from the cache memory system to the central processor and from one of the odd page and even page during a write operation from the cache meory system to the main memory respecitvely.

6. Method according to claim 5 wherein the steps of receiving the first part of the address by the dynamic mapping system and receiving the second part of the address by the first and second cache memory units are performed simultaneously.

7. Method according to claim 5 wherein the dynamic mapping system comprises a map RAM for converting logical addresses provided by the central processor into physical addresses, the method further comprising the step of selecting one of the data units read from the first and second cache memory units according to the status of a low order bit of the physical address for reading by the central processor.

8. Method according to claim 7 wherein the map RAM operates in parallel with first and second cache memory unit accesses.

9. Method according to claim 5 wherein, when said read operation from the cache memory system to the central processor is performed, one of the data units is selected for reading by the central processor, but when said write operation from the cache memory system to the main memory is performed, both of the data units are selected for parallel writing thereof to the main memory.

10. Method according to claim 5 further comprising the step of inverting the order of storage of every odd pair of data units stored in the second cache memory unit relative to the order of storage in the first cache memory unit.

* * * * *

UNITED STATES PATENT AND TRADEMARK OFFICE
CERTIFICATE OF CORRECTION

PATENT NO.   :   4,724,518

DATED        :   February 9, 1988

INVENTOR(S)  :   Steven C. Steps

It is certified that error appears in the above-identified patent and that said Letters Patent is hereby corrected as shown below:

IN THE CLAIMS:

Column 5, line 55, "processing" should read --processor--.

Signed and Sealed this

Eighteenth Day of October, 1988

Attest:

DONALD J. QUIGG

Attesting Officer

Commissioner of Patents and Trademarks